United States Patent [19]

Bonneville et al.

[11] Patent Number: 5,636,288
[45] Date of Patent: Jun. 3, 1997

[54] STANDBY POWER CIRCUIT ARRANGEMENT

[75] Inventors: Marc E. Bonneville, Gloucester; Peter L. Schuck, Orleans, both of Canada

[73] Assignee: Paradigm Electronics Inc., Woodbridge, Canada

[21] Appl. No.: 390,025

[22] Filed: Feb. 17, 1995

[51] Int. Cl.$^6$ ................................................. H04G 3/20
[52] U.S. Cl. .................................................. 381/110; 363/79
[58] Field of Search ................................. 381/110, 123; 379/90; 348/730; 345/212; 363/79, 89, 127; 455/127, 343

[56] References Cited

U.S. PATENT DOCUMENTS

| | | | |
|---|---|---|---|
| 4,107,462 | 8/1978 | Asija | 381/110 |
| 4,809,339 | 2/1989 | Shih et al. | 381/110 |
| 4,937,728 | 6/1990 | Leonardi | 363/97 |
| 5,003,578 | 3/1991 | Lin | 379/90 |
| 5,477,279 | 12/1995 | Chang | 348/730 |

FOREIGN PATENT DOCUMENTS

| | | |
|---|---|---|
| 33 23 371 A1 | 1/1985 | Germany . |
| 57017255 | 1/1982 | Japan . |

*Primary Examiner*—Curtis Kuntz
*Assistant Examiner*—Vivian W. Chang
*Attorney, Agent, or Firm*—Thomas Adams

[57] ABSTRACT

A power supply circuit arrangement for electrical equipment, such as a loudspeaker with an integral power amplifier, which can be switched between an operational mode and a standby mode in response to a detected on/off signal, provides a desirable isolation of the main supply voltage from the detector. The arrangement comprises a transformer, having a primary winding and a secondary winding, and a switched impedance device between the transformer and the power supply input. The switched impedance device is switchable between high and low impedance states in response to the detected on/off signal. A control circuit for detecting the on/off signal and switching the variable impedance states is connected in common with a main circuit of the equipment to the secondary winding of the transformer, so that their respective supply voltages are both switched, in common, by switching of the impedance device. The control circuit and variable impedance device isolate the detector from the power supply. In the operational mode, the variable impedance is switched to its low impedance and the common voltage supplied to the main circuit and the control circuit is sufficient to operate both of them. In the standby mode, the variable impedance is high and the common voltage is inadequate for normal operation of the main circuit but adequate for normal operation of the control circuit.

23 Claims, 2 Drawing Sheets

5,636,288

STANDBY POWER CIRCUIT ARRANGEMENT

BACKGROUND OF THE INVENTION

1. Technical Field

The invention relates to power supply circuit arrangements for electrical equipment and is especially applicable to power supply circuit arrangements which allow the equipment to be switched between an operational mode and a standby mode.

2. Background Art

It is known to provide electrical equipment, such as a television receiver, with a separate electronic control circuit which is connected across the input terminals of the equipment, upstream of a main on/off switch. The control circuit controls the switch to control application of the power supply voltage to a transformer in the equipment's main power supply circuit. The electronic control circuit has its own step-down transformer and AC-DC converter. In addition, it has a detector for detecting a control signal, perhaps an infra-red signal from a remote control. In the standby mode, the main on/off switch is open, but the control circuit is still energized. In response to a control signal, the control circuit closes the main on/off switch and energizes the main power supply circuit.

For safety reasons, it is desirable for the control circuit to be isolated from the main supply voltage when the equipment is in the standby mode. While such known control circuits operated by an infra-red, ultrasonic or other such electrically-isolated remote control device provide isolation, it is sometimes desirable for the control signal path to be supplied via a direct electrical connection. For example, some high fidelity audio systems and so-called "surround sound" systems employ a sub-woofer which has its own audio power amplifier. It is desirable for the sub-woofer power amplifier to be connected to a nearby power outlet and to receive only the audio signal from the audio preamplifier. When a control circuit in the sub-woofer detects receipt of an audio signal via the audio channel, it will operate a switch to connect the power supply to the subwoofer power amplifier. It is desirable for the control circuit to provide a degree of electrical isolation between the power amplifier and the preamplifier when in the standby mode.

An object of the present invention is to eliminate, or at least mitigate, the disadvantages of known power supply arrangements and to provide an improved power supply arrangement for electrical equipment which permits switching between operational and standby modes while providing a desired degree of electrical isolation and/or reduced power consumption.

SUMMARY OF THE INVENTION

According to the present invention there is provided a power supply circuit arrangement, switchable between operational and standby modes, comprising:

input means for connecting the power supply circuit arrangement to an alternating voltage supply;

a transformer having a primary winding and a secondary winding;

a main circuit and a control circuit, each connected to derive its power supply voltage from the secondary winding;

the control circuit having detector means for detecting an externally-derived signal and providing a control signal in dependence thereupon, the detector means being isolated electrically from the input means;

variable-impedance means connected between the input means and the primary winding and responsive to the control signal to switch between first and second impedance states producing corresponding first and second voltages at the secondary winding of the transformer, the first and second voltages corresponding to operating and standby modes, respectively;

the arrangement being such that, with the first impedance state selected, the corresponding power supply voltage supplied to the main circuit permits its normal operation and, with the second impedance state selected, the corresponding power supply voltage supplied to the main circuit is inadequate for its normal operation whereas a corresponding power supply voltage supplied to the control circuit is adequate for its normal operation.

In a preferred embodiment, when the first impedance state is selected, the supply voltage applied to the control circuit is the correct operating voltage for the main circuit. The control circuit is designed to operate at both the higher and lower supply voltages.

The main circuit and the control circuit may be connected to the transformer secondary winding by way of an AC-DC converter circuit, the common voltage then being a DC output voltage of the converter circuit.

The variable-impedance means may conveniently comprise a relay having its operating coil connected to the control circuit and a switch contact connected, in parallel with an impedance, between the input means and the transformer primary winding. Opening of the switch contact inserts the impedance in series with the winding, reducing the common voltage to the lower level. Conversely, closing the switch contact short-circuits the impedance, selecting a low, indeed, negligible impedance and raising the common voltage to the higher level.

Instead of a relay, an optoelectronic switch, or other suitable electrically-isolated switch may be substituted. In a preferred embodiment, the switch comprises an optocoupler and a TRIAC.

According to a preferred embodiment of the invention, a loudspeaker switchable between operational and standby modes comprises an integral power supply circuit arrangement and audio input means, the power supply circuit arrangement comprising:

power input means for connecting the power supply circuit arrangement to an alternating voltage supply, a transformer having a primary winding and a secondary winding, a speaker drive circuit and a control circuit connected to receive a common supply voltage derived from the secondary winding, the control circuit being operational in said standby mode at a supply voltage that is inadequate for operation of the speaker drive circuit in said operational mode;

the control circuit having detector means for detecting an audio signal at the audio input means and providing a control signal in dependence thereupon, the audio input means being isolated electrically from the power input means, variable-impedance switching means connected between the power input means and the primary winding and responsive to the control signal to switch between first and second impedance states, the arrangement being such that, with the first impedance state selected, the common voltage is sufficient for normal operation of the speaker drive circuit and, with the second impedance state selected, the common voltage is inadequate for normal operation of the speaker drive circuit but adequate for normal operation of the control circuit.

Various objects, features, aspects and advantages of the present invention will become more apparent from the following detailed description, taken in conjunction with the accompanying drawings, of a preferred embodiment of the invention, which is described by way of example only.

DESCRIPTION OF THE PREFERRED EMBODIMENT(S)

Figure 1:
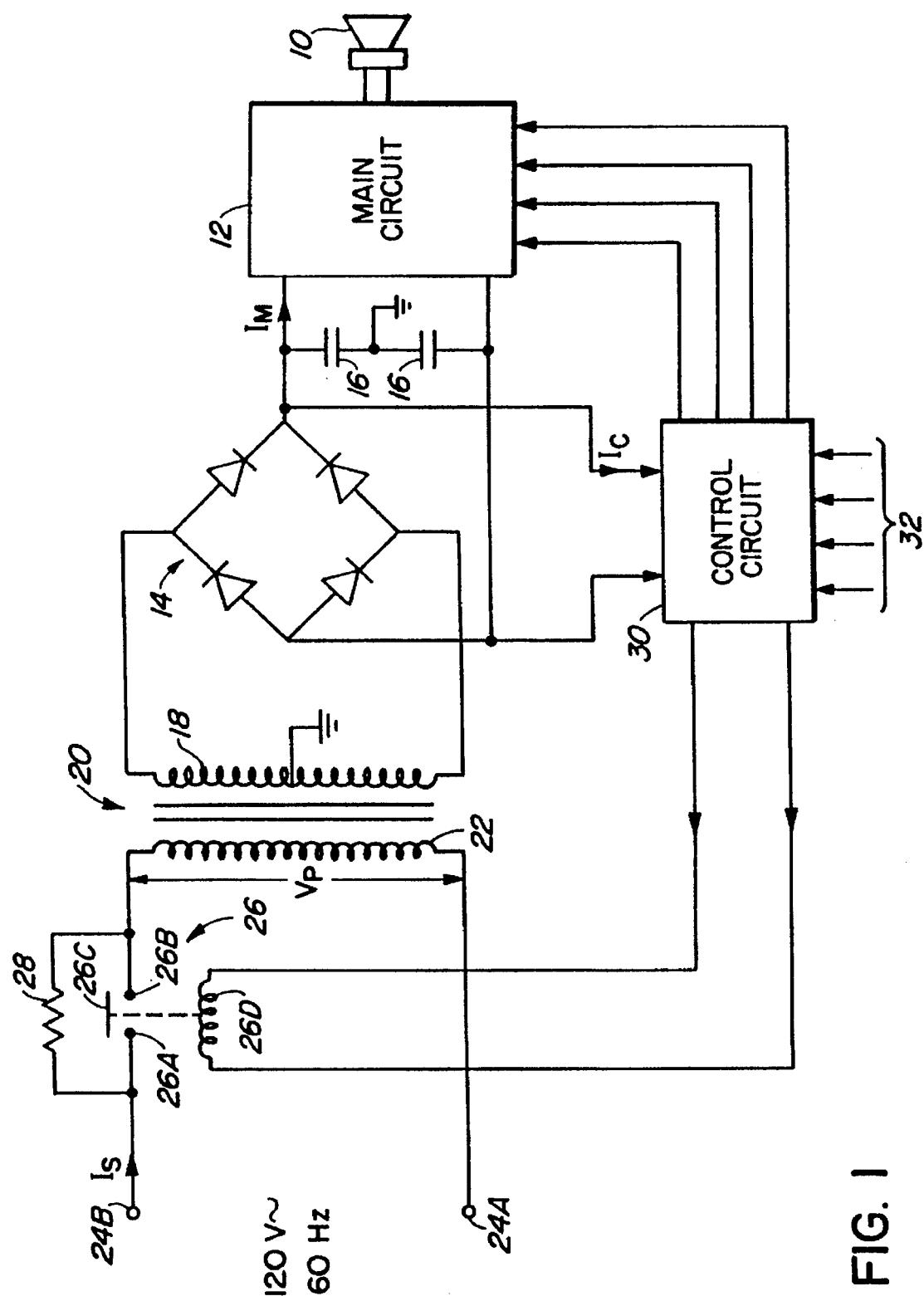
FIG. 1 is a block schematic diagram of a power supply arrangement for switching electrical apparatus between an operational mode and a standby mode.

FIG. 1 illustrates a so-called "sub-woofer" loudspeaker 10 driven by a main amplifier circuit 12 which derives power from the output of an AC-DC converter formed by a bridge rectifier 14 and smoothing capacitors 16. The bridge rectifier is connected across the secondary winding 18 of a supply transformer 20. A primary winding 22 of the transformer 20 has one end connected directly to an input terminal 24A. The other end of the primary winding 22 is connected to the other input terminal 24B via a pair of terminals 26A and 26B of a relay 26, which also comprises a switch contact 26C and operating coil 26D. In the normal operating mode, the coil 26D is energized causing contact 26C to connect the corresponding end of primary winding 22 to the input terminal 24B. In use, the input terminals 24A and 24B will be connected to a suitable source of power. In North America, the source would usually be 110–120 volts A.C. and 60 Hz.

An impedance 28, specifically a resistor, is connected in parallel with the switch terminals 26A and 26B, so that closure of the switch contact 26C short-circuits the resistor 28. The relay operating coil 26D is connected to the output of a control circuit 30. The control circuit 30 is connected to the DC output terminals of the AC-DC converter, i.e. in parallel with the main amplifier circuit 12. Four audio input lines 32 are coupled to the main amplifier circuit 12 by way of the control circuit 30.

When there is no audio signal present on any of lines 32, the control circuit 30 leaves the relay coil 26D de-energized and the switch contact 26C is open. The resistor 28 reduces the voltage applied to the primary winding 22 to such a reduced level that the voltage at the output terminals of the AC-DC converter is about ±5 volts. This is sufficient to operate the control circuit 30, but is well below the normal operating voltage, i.e. ±40 volts, of the main amplifier circuit 12, which consequently remains inoperative.

When control circuit 30 detects an audio signal on one of the audio lines 32, it energizes the relay coil 26D to close the switch contact 26C and short-circuit the resistor 28. As a result, the full supply voltage (120 volts) is applied to the transformer primary winding 22 and the DC voltage at the output of the AC-DC converter increases to about ±40 volts DC, which is the normal operating voltage of the main amplifier circuit 12. The same voltage is also applied to control circuit 30. The control circuit 30 is designed to operate at both the lower voltage and this increased supply voltage without being overloaded.

When no audio input has been present on lines 32 for a predetermined period (e.g. five minutes), the control circuit 30 de-energizes the relay coil 26D, opening switch contact 26C. The transformer 20 is not totally de-energized since resistor 28 is switched back in series with primary winding 22 reducing the output voltage of the AC-DC converter correspondingly.

The relay 26 provides electrical isolation between the input terminals 24A and 24B and the control circuit 30. Consequently, a required degree of isolation is provided even though the signal which triggers switching from standby mode to operational mode is coupled by way of a direct electrical connection, i.e. the audio lines 32.

Figure 2:
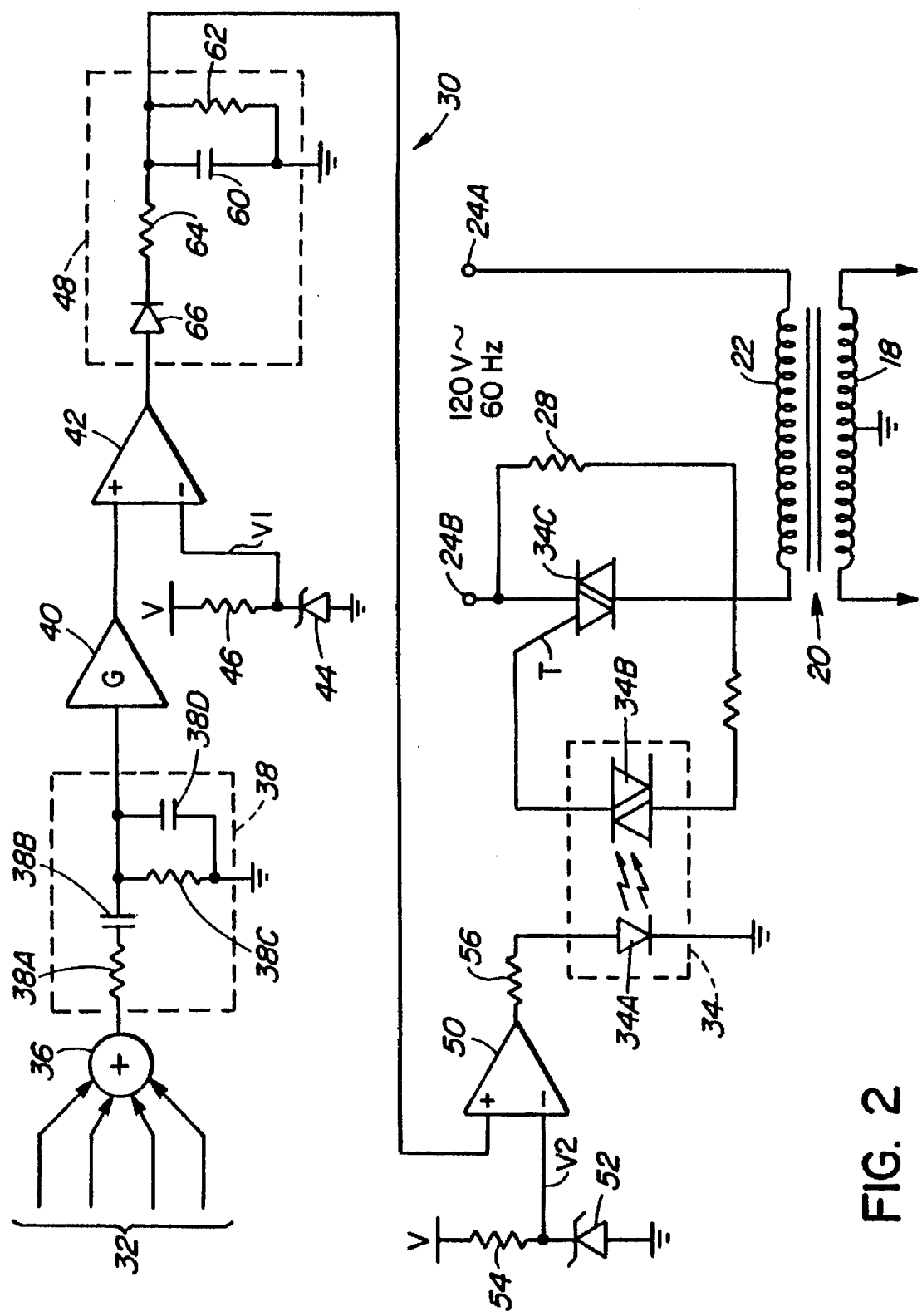
FIG. 2 is a more detailed schematic diagram of a control circuit of the arrangement of FIG. 1.

It will be appreciated that other forms of electrically-isolating switch means could be substituted for the relay 26. In FIG. 2, which shows control circuit 30 in more detail, the switch means 34 comprises an optical coupler formed by an LED 34A and photo-TRIAC 34B coupled to the trigger of a TRIAC 34C. The four audio inputs 32 are connected to a summing node 36, the output of which is supplied by way of frequency selective filter 38 to an amplifier 40. The filter 38 comprises a resistor 38A connected in series with a capacitor 38B to the input of amplifier 40. A second resistor 38C and resistor 38D are connected in parallel between the amplifier input and ground. The filter 38 restricts the signal applied to the amplifier 40 to a selected band of frequencies. For example, since this particular embodiment is an audio application, the filter 38 restricts the signal to the audio frequency band, or part of it, so as to exclude mains interference or radio frequency signals. The output of amplifier 40 is supplied to the additive input of a comparator 42. The subtractive input of the comparator 42 is connected to a Zener diode 44, which is connected to a suitable supply voltage V (+5 or +40 as convenient) by way of a feed resistor 46. The Zener diode 44 provides a first reference voltage V1 against which the comparator 42 compares the output of amplifier 40. Typically the amplifier 40 would have a 70 dB gain and the voltage reference V1 would be 1 volt. When the amplitude of the audio signal at any one of the audio inputs 32 increased to such a level that the output from the amplifier 40 exceeded the voltage reference V1, the voltage at the output of the comparator 42 would switch high. Conversely, if the audio signals ceased, and the output of the amplifier 40 fell to less than the voltage reference V1, the output of the comparator 42 would switch low.

The output of comparator 42 is supplied to a timer circuit 48, which has its output connected to the positive input of a second comparator 50. The subtractive input of the second comparator 50 is connected to a second Zener diode 52 which is fed from supply voltage V by way of a second feed resistor 54 so as to provide a second reference voltage V2. The output of second comparator 50 is coupled to the LED 34A of optical coupler 34 by way of a resistor 56. The photo-TRIAC 34B of optical coupler 34 is connected, in series with resistor 58, between the transformer primary winding 22 and the trigger electrode T of TRIAC 34C. The TRIAC 34C constitutes the "switch contact" and is connected, in parallel with bypass resistor 28, between the 120 volt supply line and the primary winding 22 of transformer 20.

Hence, when the output of comparator 50 is high, the optical coupler 34A is turned on, operating TRIAC 34C and connecting the 120 volt supply directly to the transformer primary winding 22. Following cessation of the audio input signal, the output of timer circuit 48 will decay. When comparator 50 detects that it is less than reference voltage V2, the output of comparator 50 will switch low, causing the optical coupler 34A/B to switch the TRIAC 34C to its open circuit state. As described with reference to FIG. 1, the resistor 28 maintains the supply to transformer primary winding 22, but at such a reduced voltage that only control circuit 30 will be operative, the voltage applied to the main amplifier circuit 12 being insufficient for normal operation.

When charging, the timer circuit 48 has a relatively short time constant, for example one second. When discharging, however, it has a relatively long time constant, say five minutes. Consequently, when an audio signal is detected, the output of the charging circuit 48 rises fairly rapidly, causing the TRIAC 34C to "close" promptly. The turn-on delay or time period is sufficient to ensure that the equipment is not switched to the operational mode by transient signals, such as interference on the audio lines or from elsewhere. On the other hand, when the output of the comparator 42 switches low, because the audio input signal has ceased, the TRIAC 34C will not "open" for about five minutes. This time period ensures that the drive amplifier 12 of the sub-woofer loudspeaker 10 is not turned off as a result of a temporary period of silence in the audio signal. The timer circuit 48 may be relatively simple. FIG. 2 illustrates a suitable circuit comprising a capacitor 60 in parallel with a resistor 62, the combination being connected to the output of the comparator 42 by way of a resistor 64 and diode 66, in series. Suitable values for capacitor 60, resistor 62 and resistor 64 are 100microfarads, 1 Megohm and 10 kilohm, respectively.

It is envisaged that either or both of the turn-on and turn-off time periods could be made adjustable so that the user could select suitable time intervals. This could be achieved by making resistor 64 adjustable to control the duration of the turn-on time period, which is determined by resistors 62 and 64 in parallel, resistor 64 having the lower value, and/or making resistor 62 adjustable to control the duration of turn-off time period.

It should be noted that, although the control circuit 30 is energized in the standby mode, there is no direct electrical connection between the 120 volt supply line and the audio inputs 32 since the switch means 26/34 and transformer 20 provide electrical isolation.

The value of impedance may be relatively low. Thus, in a practical circuit embodying the invention, with a supply voltage of 120 volts, a 150 VA transformer 20, impedance 28 of 5000Ω was selected to give the following currents $I_S$, $I_M$ and $I_C$ and voltage $V_P$ (see FIG. 1) were measured in operational and standby modes:

Operational Mode

Supply voltage $V_S$=120 VAC;

Primary voltage $V_P$=120 VAC;

Supply current $I_S$ (quiescent)=185 mA.;

Supply current $I_S$ (full power)=2 A;

Main circuit current $I_M$ (full power)=3 A;

Main circuit current (quiescent)=100 mA;

Control circuit current $I_C$=6 mA.

Standby Mode

Supply voltage $V_S$=120 VAC;

Primary voltage $V_P$=20 VAC;

Supply current $I_S$=20 mA.;

Main circuit current $I_M$<1 mA;

Control circuit current $I_C$=5 mA.

It should be noted that the value of impedance required to reduce the secondary voltage by a predetermined amount is less than might be expected for a given transformer primary impedance. In particular, reducing the voltage on the primary by enough to prevent partial saturation of its core, will result in higher transformer impedance. Such circuits usually work with the transformer core partially saturating. A relatively small reduction in the primary voltage, sufficient to stop the partial saturation of the core, will cause the leakage current to fall rapidly.

In the above-described embodiment, the main circuit 12 is inoperative at the reduced supply voltage. It should be appreciated that this does not preclude there being other circuits in the equipment connected in common with the either the main circuit or the control circuit which, like the control circuit, would be operative at the reduced voltage. Such other circuits might operate, for example, in response to other conditions to force the equipment into the standby mode, or parts of it into a low current-consumption mode or "sleep" mode.

Indeed, it is not necessary to reduce the main circuit voltage to such a low level that it does not operate at all. It may be sufficient to reduce the supply voltage to the circuit by, say, 18 or 20 per cent, with a corresponding reduction in the voltage applied to the main circuit.

So far as the main circuit is concerned, the reduction in voltage at the transformer, and the increased impedance due to the variable impedance being reflected to the secondary of the transformer, and the increased impedance of the transformer, may be such that it will not operate because it is unable to draw the necessary power from the supply. Nevertheless, even in the standby mode, it might still consume power due for example, to bias current. In the case of a sub-woofer loudspeaker with integral amplifier, there might still be enough power for the loudspeaker to make clicks and other noises due to interference, which would be disconcerting and irritating for the user. Consequently, it is preferable to reduce the voltage supplied the main circuit to such an extent that the loudspeaker is incapable of even such intermittent or abnormal operation.

The control circuit, however, may draw much the same current in both modes of operation of the equipment.

The following table shows results of tests on a 150 VA transformer, as used in the practical example, with the secondary winding open-circuit:

| Primary VAC (VP) | Current (mA) | Equivalent Regulation Impedence (Ω) |
|---|---|---|
| 120 | 136 | 882 |
| 110 | 105 | 1047 |
| 100 | 82 | 1219 |
| 90 | 63 | 1429 |
| 60 | 37 | 1622 |
| 30 | 23 | 1305 |
| 20 | 16 | 1250* |
| 10 | 10 | 1000 |

With 120 VAC primary voltage, the current consumption is quite significant due to partial saturation of the transformer core. At the reduced primary voltage, core saturation is greatly reduced and primary leakage current is reduced in a non-linear fashion. Thus, halving the primary voltage reduces output current to approximately one quarter of its original value.

Various modifications and alternatives are embraced by the present invention. For example, the invention is not limited to the specific examples of switch means 26/34 described herein, but embraces any other arrangement which will provide the required isolation between the power supply and the control circuit. Moreover, the resistor 28 could be a reactive component, or a combination of resistive and reactive components, i.e. resistors, inductors, capacitors, or non-linear components, diodes, Zener diodes, transistors, etc. to provide a complex impedance to suit a particular circuit impedance for the transformer 20. In the described embodiment, the main circuit 12 and the control circuit 30 are connected to the output of the AC-DC conversion circuitry, which avoids duplication of rectifiers and smoothing capacitors. It will be appreciated, however, that the two circuits could have their own AC-DC conversion circuitry and be connected directly to the transformer secondary winding. It is also envisaged that the control circuit might be connected across only part of the secondary winding 18 or, indeed to an additional secondary winding.

Although the preferred embodiment of the invention described herein is a sub-woofer loudspeaker with its own integral power amplifier, it should be appreciated that the invention is applicable to other equipment which needs to be switched between standby and operational modes in response to a control signal which is derived externally. For example, embodiments of the present invention could be used to turn on a high-fidelity amplifier when a peripheral component has been switched on; or to turn on an appliance by remote control, perhaps via a telephone line or control computer.

Although an advantage of circuits embodying the invention is that they provide isolation, enabling the control or "stimulus" signal to be "hard-wired", it should be noted that the invention is not limited to such applications but could also be implemented with an infra-red, ultrasonic, radio or other electrically-isolated control signal.

Although an embodiment of the invention has been described and illustrated in detail, it is to be clearly understood that the same is by way of illustration and example only and is not to be taken by way of the limitation, the spirit and scope of the present invention being limited only by the appended claims.

What is claimed is:

1. A power supply circuit arrangement, switchable between operational and standby modes, comprising:

power input means for connecting the power supply circuit arrangement to an alternating voltage power supply;

a transformer having a primary winding and a secondary winding;

a main circuit and a control circuit, each connected to derive its power supply voltage from the secondary winding;

the control circuit having detector means for detecting an externally-derived signal and providing a control signal in dependence thereupon, the detector means being isolated electrically from the input means;

variable-impedance means connected between the input means and the primary winding and responsive to the control signal to switch between first and second impedance states producing corresponding first and second voltages at the secondary winding of the transformer, the first and second voltages corresponding to operating and standby modes, respectively;

the arrangement being such that, with the first impedance state selected, the corresponding power supply voltage supplied to the main circuit permits its normal operation and, with the second impedance state selected, the corresponding power supply voltage supplied to the main circuit is substantially inadequate for its normal operation whereas a corresponding power supply voltage supplied to the control circuit is adequate for its normal operation.

2. An arrangement as defined in claim 1, wherein the main circuit and the control circuit are connected to receive a common supply voltage as their respective power supply voltages.

3. An arrangement as defined in claim 1, wherein the main circuit and the control circuit are connected to the transformer secondary winding by way of an AC-DC converter circuit, the power supply voltage of each of the main circuit and the control circuit being the output voltage of the converter circuit.

4. An arrangement as defined in claim 1, wherein the variable-impedance means comprises switch means and impedance means connected in parallel with each other between the input means and the primary winding, the switch means being operable in response to the control signal to select, alternatively, said second impedance state by inserting the impedance in series with the primary winding, reducing the voltage across the primary winding, and said first impedance state by short-circuiting the impedance, raising the voltage across the primary winding.

5. An arrangement as defined in claim 4, wherein the switch means comprises a relay having switch contacts connected in parallel with said impedance and switch operating means connected to said control circuit.

6. An arrangement as defined in claim 4, wherein the switch contact means comprises an active device.

7. An arrangement as defined in claim 4, wherein the switch means comprises a semiconductor switching device coupled to said control circuit by means of an optical coupler.

8. An arrangement as defined in claim 4, wherein the impedance comprises a resistance.

9. An arrangement as defined in claim 4, wherein the impedance comprises a combination of resistive and reactive components.

10. An arrangement as defined in claim 1, wherein the variable impedance means comprises one or more non-linear elements.

11. An arrangement as defined in claim 1, wherein the control circuit comprises timer means for delaying switching from the first voltage to the second voltage for a predetermined period after the detecting means has detected a corresponding change in the externally-derived signal.

12. An arrangement as defined in claim 1, wherein the control circuit comprises timer means for delaying selection of the first voltage for a first time period after the detecting means has detected presence of the externally-derived signal, and delaying selection of the second voltage for a second time period after the detecting means has detected discontinuance of the externally-derived signal, the first time period being longer than the second time period.

13. A power supply circuit arrangement, switchable between operational and standby modes, comprising power input means for connecting the power supply circuit arrangement to an alternating voltage power supply, a transformer having a primary winding and a secondary winding, AC-DC converter means having an input and an output, the input being connected to the secondary winding, a main circuit and a control circuit connected in common to the output of the AC-DC converter means to receive a common supply voltage, the control circuit being operable at a supply voltage that is insufficient for operation of the main circuit, the control circuit having detector means for detecting an externally-derived signal and providing a control signal in dependence thereupon, the detector means being isolated electrically from the input means, variable-impedance switching means connected between the input means and the primary winding and responsive to the control signal to switch between higher and lower impedance states, the arrangement being such that, with the lower impedance state selected, the common voltage is the prescribed operating voltage of the main circuit and, with the higher impedance state selected, the common voltage is inadequate for normal operation of the main circuit but adequate for normal operation of the control circuit.

14. An arrangement as defined in claim 13, wherein the variable-impedance means comprises a switch means connected, in parallel with an impedance, between the input means and the primary winding, and operating means electrically isolated from the switch means and responsive to the control signal to operate the switch means to select said first and second impedance sates, alternatively, by inserting the impedance in series with the winding, reducing the common voltage, and short-circuiting the impedance, raising the common voltage to said prescribed operating voltage of the main circuit.

15. An arrangement as defined in claim 14, wherein the switch means and operating means comprise switch contacts and operating means, respectively, of a relay.

16. An arrangement as defined in claim 13, wherein the switch means comprises an active device.

17. An arrangement as defined in claim 13, wherein the switch means comprises a semiconductor switching device connected to the control circuit by means of an optical coupler.

18. An arrangement as defined in claim 13, wherein the control circuit comprises timer means for delaying switching from the first voltage to the second voltage for a predetermined period after the detecting means has detected a corresponding change in the externally-derived signal.

19. An arrangement as defined in claim 13, wherein the control circuit comprises timer means for delaying selection of the first voltage for a first time period after the detecting means has detected presence of the externally-derived signal, and delaying selection of the second voltage for a second time period after the detecting means has detected discontinuance of the externally-derived signal, the first time period being longer than the second time period.

20. A loudspeaker switchable between operational and standby modes comprising an integral power supply circuit arrangement and audio input means, the power supply circuit arrangement comprising:

power input means for connecting the power supply circuit arrangement to an alternating voltage supply, a transformer having a primary winding and a secondary winding, a speaker drive circuit and a control circuit connected to receive a common supply voltage derived from the secondary winding, the control circuit being operational in said standby mode at a supply voltage that is inadequate for operation of the speaker drive circuit in said operational mode;

the control circuit having detector means for detecting an audio signal at the audio input means and providing a control signal in dependence thereupon, the audio input means being isolated electrically from the power input means, variable-impedance switching means connected between the power input means and the primary winding and responsive to the control signal to switch between first and second impedance states, the arrangement being such that, with the first impedance state selected, the common voltage is sufficient for normal operation of the speaker drive circuit and, with the second impedance state selected, the common voltage is inadequate for normal operation of the speaker drive circuit but adequate for normal operation of the control circuit.

21. A loudspeaker as defined in claim 20, wherein the control circuit comprises timer means for delaying selection of the standby mode for a predetermined period after the detecting means has detected discontinuance of the audio signal.

22. A loudspeaker as defined in claim 20, wherein the control circuit comprises timer means for delaying selection of the operational mode for a first time period after the detecting means has detected presence of the audio signal, and delaying selection of the standby mode for a second time period after the detecting means has detected discontinuance of the audio signal, the first time period being longer than the second time period.

23. A loudspeaker comprising an integral power supply circuit arrangement and audio input means, the power supply circuit arrangement being switchable between operational and standby modes and comprising:

power input means for connecting the power supply circuit arrangement to an alternating voltage supply, a transformer having a primary winding and a secondary winding, a speaker drive circuit and a control circuit connected to receive a common supply voltage derived from the secondary winding, the control circuit having detector means for detecting a signal at the audio input means and providing a control signal in dependence thereupon, variable-impedance switching means connected between the power input means and the primary winding and responsive to the control signal to switch between first and second impedance states, the control circuit being responsive to said signal at the audio input to select the first impedance state and the second impedance state alternatively and switch the loudspeaker between said operational mode and said standby mode.

* * * * *